United States Patent
Gill

(10) Patent No.: US 7,369,373 B2
(45) Date of Patent: May 6, 2008

(54) CPP GMR WITH HARD MAGNET IN STACK BIAS LAYER

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 127 days.

(21) Appl. No.: 10/833,350

(22) Filed: Apr. 26, 2004

(65) Prior Publication Data

US 2005/0238924 A1  Oct. 27, 2005

(51) Int. Cl.
*G11B 5/39* (2006.01)

(52) U.S. Cl. .............. 360/324.12; 360/324.2; 428/811.1; 428/811.2; 428/811.5

(58) Field of Classification Search .......... None
See application file for complete search history.

(56) References Cited

U.S. PATENT DOCUMENTS

| | | | |
|---|---|---|---|
| 5,795,663 A | 8/1998 | Koike et al. | 428/692 |
| 6,876,525 B2* | 4/2005 | Lin et al. | 360/324.12 |
| 7,132,175 B2* | 11/2006 | Hasegawa et al. | 428/811.2 |
| 7,221,545 B2* | 5/2007 | Gill | 360/324.11 |
| 7,280,325 B1* | 10/2007 | Pan | 360/324.12 |
| 7,283,336 B2* | 10/2007 | Gill | 360/324.12 |
| 2001/0005300 A1* | 6/2001 | Hayashi | 360/317 |
| 2002/0015269 A1* | 2/2002 | Iwasaki et al. | 360/324.12 |
| 2002/0044398 A1* | 4/2002 | Sasaki et al. | 360/324.12 |
| 2003/0053269 A1 | 3/2003 | Nishiyama | 360/324.1 |
| 2003/0143431 A1 | 7/2003 | Hasegawa | 428/692 |
| 2003/0174446 A1 | 9/2003 | Hasegawa | 360/319 |
| 2004/0145836 A1* | 7/2004 | Kojima et al. | 360/324.12 |

OTHER PUBLICATIONS

JPO Abstract Translation of JP 2004-119534 A.*

* cited by examiner

*Primary Examiner*—Kevin M. Bernatz
(74) *Attorney, Agent, or Firm*—Zilka-Kotab, PC

(57) ABSTRACT

A current perpendicular to plane magnetorestive sensor having an improved in stack biasing. An amorphous layer breaks the structure allowing a desire crystolographic structure in an in stack bias layer that provides greatly increased coercivity (Hc) in the bias layer.

24 Claims, 4 Drawing Sheets

CPP GMR WITH HARD MAGNET IN STACK BIAS LAYER

FIELD OF THE INVENTION

The present invention relates to magnetoresistive sensors and more particularly to an in stack biasing design for biasing a free layer of a CPP sensor such as a CPP GMR or a tunnel valve.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer). A pinning layer in a bottom spin valve is typically made of platinum manganese (PtMn). The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor.

In order to increase data density and data rate even further, in recent years researchers have focused on the use of tunnel junction (TMR) sensors or tunnel valve. A TMR sensor employs an electrically insulating spacer layer rather than a conductive spacer layer. A tunnel valve operates based on quantum mechanical tunneling of electrons through the insulating spacer layer. This tunneling is maximized when the magnetizations of the free and pinned layers are parallel to one another adjacent to the spacer layer.

The ever increasing demand for data storage density and data rate have increasingly pushed the limits of data storage designs. Recently in efforts to overcome such limits, engineers and scientists have focused on the use of perpendicular recording. In a perpendicular recording system a write pole emits a highly concentrated magnetic flield that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded.

The increased interest in perpendicular recording has lead to a increased interest in current perpendicular to plane (CPP) magnetoresistive sensor such as CPP GMRs and Tunnel Valves. Such CPP magnetoresistive sensors are particularly suited to use in perpendicular recording. However, the use of such CPP sensors presents certain design challenges. For example, methods used to bias the magnetization of the free layer in a CIP design will not work as well in a CPP sensor design. In a traditional CIP GMR design, biasing is usually provided by a pair of hard bias layers formed at either side of the sensor. The hard bias layers are formed of a high coercivity material (high Hc) and contact the left and right sides of the sensor as viewed from the ABS. Since the current flows through the sensor in a direction parallel with the planes of the sensor, the presence of the hard bias layers (which are electrically conductive) only improves the sense current delivery, and contact of the hard bias layers with the sensor is not a problem.

However, in a CIP sensor design such contact of the laterally opposed hard bias layers with the sensor would cause current shunting, rendering the sensor inoperable. To overcome this, CIP sensor have been designed with thin insulation layers deposited at either side of the sensor, thereby separating the hard bias layers from the sides of the sensor. While this solves the shunting problem, it also leads to insufficient biasing of the free layer.

One attempt to overcome this problem has been to use in stack bias layers. An in stack bias layer is formed, not at the sides of the sensor, but generally above the sensor in the same stack as the sensor. An in stack bias layer generally includes a magnetic layer and a layer of antiferromagnetic material (AFM layer) exchange coupled thereto. A non-magnetic spacer layer separates the in stack bias layer from the free layer to avoid exchange coupling the in stack bias layer with the free layer, which might cause pinning of the free layer.

Such AFM pinned in stack bias layer designs have several drawbacks, however. For example, AFM layers are very thick relative to the other layers in the sensor, and therefore, require a large gap thickness. Since a desired decreased bit size requires decreased gap thickness, any such increase in gap thickness is to be avoided. Another problem with the use of such AFM pinned in stack bias layers if that setting the AFM requires an annealing step that may interfere with the setting of the AFM used to pin the pinned layer. Such AFM pinned bias layers are also sensitive to temperature spikes, such as from a head disk contact, that can cause the AFM to loose it's pinning. In addition, the such AFM layers, when used in an in stack bias layer provide a magnetic biasing of only about 200 Oe. Much stronger biasing would be desired.

Therefore, there is a strong felt need for an in stack bias scheme that can provide strong biasing of a free layer. Such a biasing scheme would preferably avoid many or all of the problems associated with the use of an AFM layer.

SUMMARY OF THE INVENTION

The present invention provides a magnetoresistive sensor having an in stack bias layer. The sensor includes a free layer, and an amorphous layer deposited thereover. A layer of Cr is formed over the amorphous layer and a layer of hard magnetic material is formed over the Cr layer.

The amorphous layer breaks the epitaxial growth pattern, which would otherwise be a FCC crystallographic structure carried over from the underlying free layer. The Cr layer, then initiates a desirable BCC crystallographic structure which continues through to the hard bias layer formed thereover. When the hard bias layer a has a BCC structure, rather than the FCC structure that it would have if not for the presence of the amorphous layer, the hard bias layer has a coercivity Hc of 1000 Oe, as opposed to the mere 200 Oe provided by prior art AFM pinned in stack bias layer designs.

In addition, since no AFM is required, the hard bias layer can be set by simply placing the sensor in a magnetic field of sufficient strength. No annealing process is required so there is no risk of undoing the annealing of the AFM pinning of the pinned layer.

Also, eliminating the AFM layer from the sensor stack greatly reduces the stack height. If an AFM layer were used, the AFM layer itself would be about 150 Angstroms thick. By contrast the entire thickness of an in stack bias layer according to the present invention is only about 45 Angstroms.

Eliminating the need for an AFM layer also eliminates temperature sensitivity problems that occur when a blocking temperature of an AFM layer is reached during a heat spike such as when the head contacts the disk.

These and other advantages of the invention will be better appreciated upon reading the following detailed description in conjunction with the accompanying Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
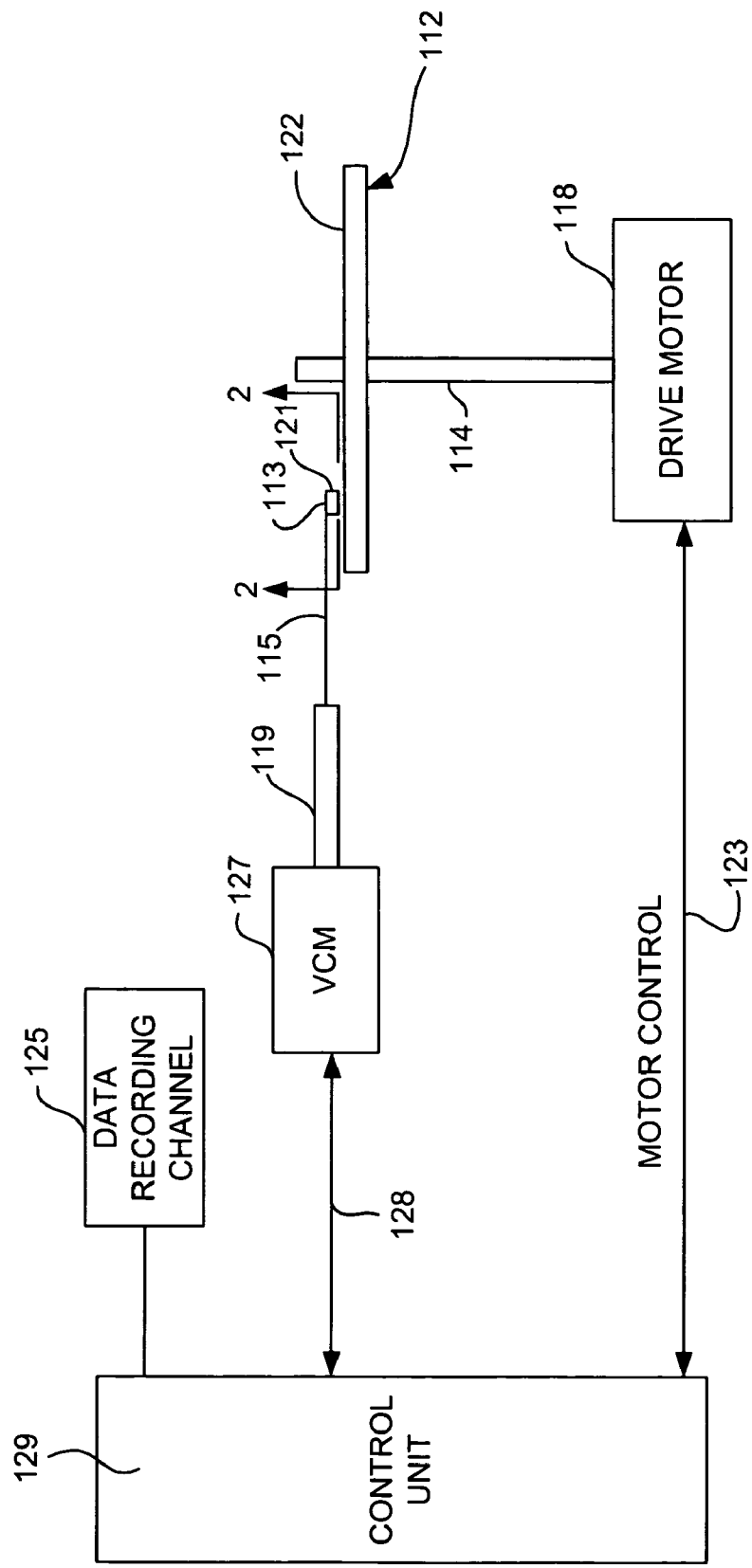
FIG. 1 is a schematic illustration of a disk drive system in which the invention might be embodied.

Referring now to FIG. 1, there is shown a disk drive 100 embodying this invention. As shown in FIG.1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
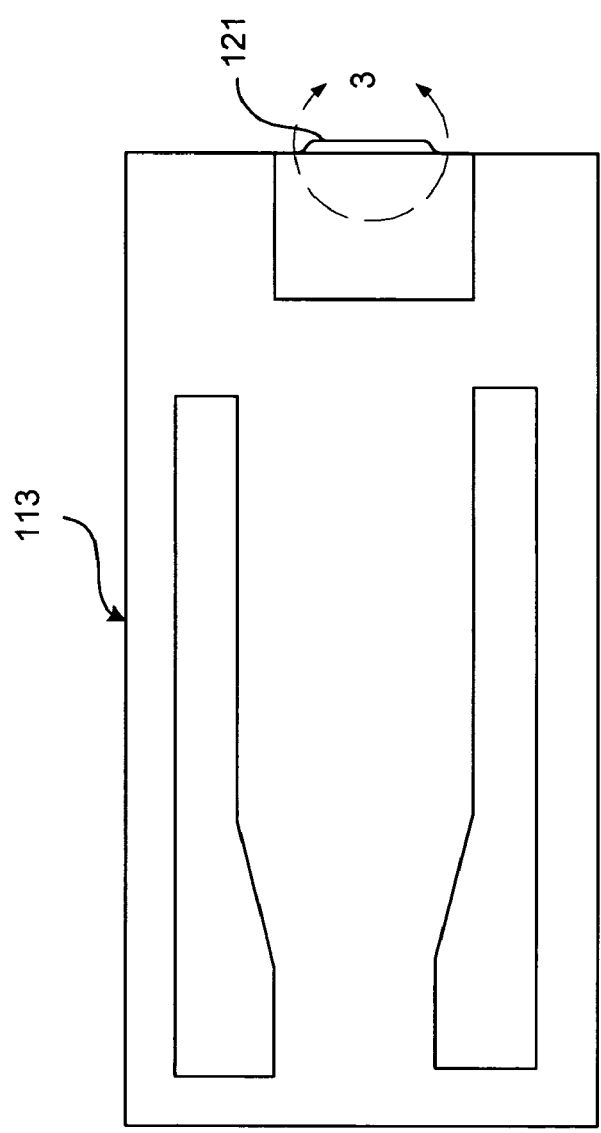
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
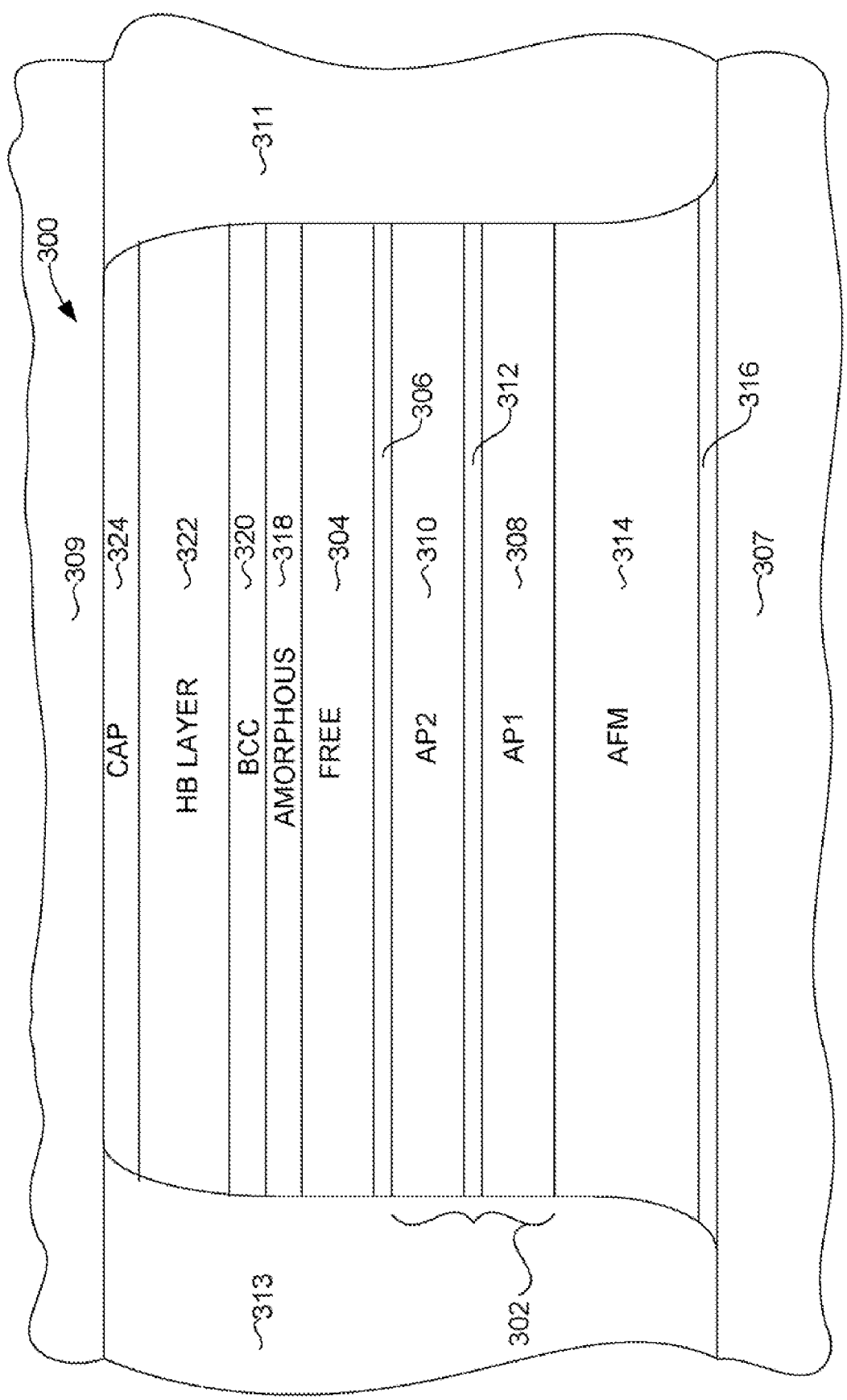
FIG. 3 is an ABS view of a magnetic sensor according to an embodiment of the present invention taken from circle 3 of FIG. 2.

With reference now to FIG. 3, a CPP magnetoresistive sensor 300 according to the present invention includes a pinned layer 302 and a free layer 304. A spacer layer 306 separates the pinned layer 302 from the free layer 304. The spacer layer 306 is constructed of a non-magnetic, electrically conductive material such as for example Cu. It should be pointed out at this point that, the invention as described with reference to FIG. 3 is being described as a CPP GMR (ie. the spacer layer is an electrically conductive material). However, the present invention could also be embodied in a tunnel valve, in which case the spacer layer 306 would be a non-magnetic, electrically insulating barrier layer such as alumina ($Al_2O_3$). The sensor 300 is sandwiched between upper and lower electrically conductive, magnetic shields 307, 309, which also function as leads for supplying sense current to the sensor 300. First and second electrically insulating fills layers 311, 313 are provided at each of the laterally opposed sides of the sensor.

With continued reference to FIG. 3, the pinned layer structure can include first and second magnetic layers AP1 308 and AP2 310 separated from one another by a non-magnetic AP coupling layer 312 such as Ru. The pinned layer may be pinned by an AFM layer 314, which would be exchange coupled with the first magnetic layer AP1 308. Alternatively, the pinned layer could be self pinned in which case the pinned layer would be pinned by a magnetic anisotropy provided by a strong positive magnetostriction of the AP1 and AP2 layers 308, 310 coupled with compressive stresses present in the sensor. The AP1 and AP2 layers can be constructed of for example CoFe. The free layer can be constructed of a magnetic material such as Co, CoFe, NiFe or a combination of these materials. A seed layer 316 can be provided beneath the pinned layer 314 to initiate a desired FCC crystallographic structure in the subsequently deposited layers.

With reference still to FIG. 3, according to the present invention a layer of amorphous material 318 is deposited over the free layer. As mentioned above, the free layer has a FCC crystallographic structure. This FCC epitaxial structure initiates with the seed layer 316 and carries through the subsequent layers. The amorphous layer 318 breaks this epitaxial structure, because the amorphous layer has no crystallographic structure.

A layer 320 having a body centered cubic structure (BCC) is deposited above the amorphous layer. The layer 320 can be for example Cr. The BCC structure of the Cu layer 320 propagates into a hard bias layer 322 deposited thereover. The hard bias layer is constructed of a high coercivity (high Hc) material such as CoPtCr. As mentioned, the Cr layer deposited below the hard bias layer 322 causes a BCC structure in the hard bias layer 322. This BCC structure in the hard bias layer 322 greatly increases the coercivity of the hard bias layer. For example, a CoPtCr bias layer 322 having a BCC structure has a coercivity of about 1000 Oe, as compared with a coercivity of about 100 Oe for the same material with the FCC structure that would be present if not for the presence of the amorphous layer 318 and Cr layer 320. By forcing a change in the epitaxial growth of the hard bias layer 322, the coercivity of the bias layer can be increased well above that which can be achieved with by exchange coupling with an AFM layer. After depositing the hard bias layer 322, a capping layer 324, such as Ta can be deposited.

With continued reference to FIG. 3, the amorphous layer 318 can be constructed of for example, NiTa, (about 40 atomic percent Ta) and could be for example 10-20 Angstroms. The amorphous layer could also be constructed of CoFeX, where X is a material such as Hf, Nb, or B and if constructed of CoFeX the amorphous layer could be about 5-10 Angstroms thick. Since this layer can constitute part of the top portion of the free layer. In view of this then, this does not add any extra thickness to the sensor stack. The BCC layer 320, which as mentioned could be constructed of Cr, can have a thickness of about 10-20 Angstroms. The hard bias layer 322 is preferably about 1 to 1.5 times the thickness of the free layer for the case where the CoPtCr layer is comparable to the free layer moment.

Figure 4:
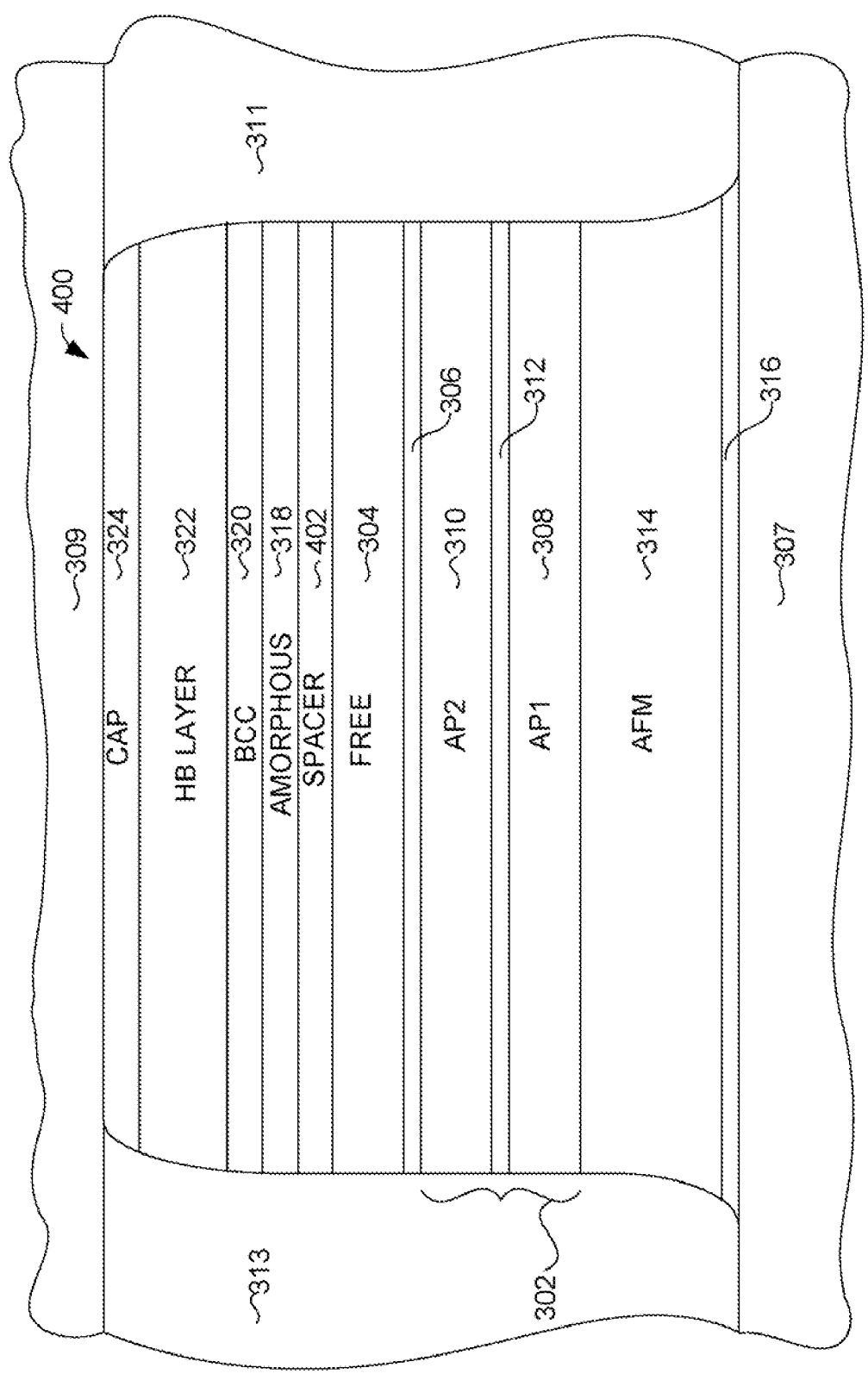
FIG. 4 is an ABS view of a magnetic sensor according to an alternate embodiment of the invention.

With reference now to FIG. 4, an alternate embodiment of the invention includes a sensor 400 having a spacer layer 402 disposed between the free layer 304 and the amorphous layer 318. The spacer layer can be included to provide increased magnetic separation between the hard bias layer 322 and the free layer 304 if such separation is deemed necessary to prevent exchange coupling of the bias layer 322 and free layer 304. The spacer layer can be constructed of for example CuO, Ru, Ta or some other, preferably non-magnetic, material. The presence of the spacer layer 402 as described in this embodiment is considered optional, because the Cr layer 320 may act effectively as a spacer layer.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A current perpendicular to plane (CPP) magnetorsistive sensor, comprising:
   a free layer; and
   an in stack bias structure formed over the free layer the in stack bias structure further comprising:
      an amorphous layer formed over said free layer, the amorphous layer being directly adjacent to the free layer; and a layer of magnetic hard bias material formed over said amorphous layer, such that the amorphous layer is between the free layer and the layer of magnetic hard bias material; and wherein the sensor has first and second laterally opposed sides and the in stack bias structure extends between the first and second laterally opposed sides.

2. A CPP magnetoresistive sensor as in claim 1 wherein said amorphous layer comprises NiTa.

3. A CPP magnetoresistive sensor as in claim 1 wherein said amorphous layer comprises a nonmagnetic material and has a thickness of 10 to 20 Angstroms.

4. A CPP magnetoresistive sensor as in claim 1 further comprising a layer of Cr disposed between said amorphous layer and said magnetic hard bias material.

5. A CPP magnetoresistive sensor as in claim 4 wherein said Cr layer has a thickness of 10 to 20 Angstroms.

6. A CPP magnetoresistive sensor as in claim 1 wherein said free layer has a thickness and wherein said magnetic hard bias layer has a thickness that is 1 to 1.5 times said thickness of said free layer.

7. A CPP magnetoresistive sensor as in claim 1 wherein said amorphous layer comprises CoFeX, where X is comprises a material selected from the group consisting of Hf and Nb.

8. A CPP magnetoresistive sensor as in claim 1 wherein said magnetoresistive sensor is a CPP giant magnetoresistive sensor (GMR).

9. A CPP magnetoresistive sensor as in claim 1 wherein said magnetoresistive sensor is a tunnel valve.

10. A CPP magnetoresistive sensor as in claim 1, wherein said amorphous layer comprises an oxidized magnetic material and wherein said amorphous layer has a thickness of 5 to 10 angstroms.

11. A current perpendicular to plane (CPP) magnetoresistive sensor, comprising:
a pinned magnetic layer structure;
a free magnetic layer;
a first spacer layer sandwiched between said free layer and said pinned layer structure; and
an in stack bias structure formed over said free layer, the in stack bias structure further comprising:
a second spacer layer formed over said free layer opposite said first spacer layer;
a layer of amorphous material formed over and adjacent to said second spacer layer, such that the second spacer layer is sandwiched between the layer of amorphous material and die free magnetic layer;
a layer of Cr formed directly over said amorphous layer; and
a layer of hard magnetic material formed over said Cr layer; and
wherein the sensor has first and second laterally opposed sides and the in stack bias structure extends between the first and second laterally opposed sides.

12. A CPP magnetoresistive sensor as in claim as in claim 11, wherein said first spacer layer is a non-magnetic, electrically conductive material and said magnetoresistive sensor is a CPP giant magnetoresistive (GMR) sensor.

13. A CPP magnetoresistive sensor as in claim 11, wherein said first spacer layer is a non-magnetic, electrically insulating material and said magnetoresistive sensor is a tunnel valve.

14. A CPP magnetoresistive sensor as in claim 11 wherein said second spacer layer comprises Ta.

15. A CPP magnetoresistive sensor as in claim 11, wherein said second spacer layer comprises CuO.

16. A CPP magnetoresistive sensor as in claim 11, wherein said second spacer layer comprises Ru.

17. A CPP magnetoresistive sensor as in claim 11 wherein said amorphous layer comprises a non-magnetic material and has a thickness of 10 to 20 Angstroms.

18. A CPP magnetoresistive sensor as in claim 11 wherein said amorphous layer comprises an oxidized magnetic material and has a thickness of 5 to 10 Angstroms.

19. A CPP magnetoresistive sensor as in claim 11 wherein said amorphous layer comprises NiTa.

20. A CPP magnetoresistive sensor as in claim 11 wherein said amorphous layer comprises CoFeX, where X is selected from the group of materials consisting of Hf and Nb.

21. A CPP magnetoresistive sensor as in claim 11 wherein said layer of Cr has a thickness of 10 to 20 Angstroms.

22. A CPP magnetoresistive sensor as in claim 11 wherein said high Hc magnetic material comprises CoPtCr.

23. A CPP magnetoresistive sensor as in claim 11 wherein said high Hc magnetic material comprises CoPt.

24. A CPP magnetoresistive sensor as in claim 11 wherein said free layer has a thickness and said high Hc magnetic material layer has a thickness that is 1 to 1.5 time the thickness of the free layer.

* * * * *